(12) United States Patent
Djelouah et al.

(10) Patent No.: US 12,062,152 B2
(45) Date of Patent: Aug. 13, 2024

(54) RE-NOISING AND NEURAL NETWORK BASED IMAGE ENHANCEMENT

(71) Applicant: Disney Enterprises, Inc., Burbank, CA (US)

(72) Inventors: Abdelaziz Djelouah, Zurich (CH); Shinobu Hattori, Playa Vista, CA (US); Christopher Richard Schroers, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 453 days.

(21) Appl. No.: 17/459,353

(22) Filed: Aug. 27, 2021

(65) Prior Publication Data

US 2023/0065392 A1    Mar. 2, 2023

(51) Int. Cl.
*G06T 5/00* (2024.01)

(52) U.S. Cl.
CPC ...... *G06T 5/00* (2013.01); *G06T 2207/20081* (2013.01)

(58) Field of Classification Search
CPC ............. G06T 5/00; G06T 2207/20081; G06T 2207/20084; G06T 5/002
See application file for complete search history.

(56) References Cited

U.S. PATENT DOCUMENTS

| | | |
|---|---|---|
| 2021/0049739 A1 | 2/2021 | Schroers et al. |
| 2022/0148130 A1* | 5/2022 | Tang ...................... G06N 3/045 |
| 2022/0309672 A1* | 9/2022 | Cherian ................... G06T 7/75 |
| 2023/0080693 A1* | 3/2023 | Hu ........................... G06T 5/70 |
| | | 382/275 |

FOREIGN PATENT DOCUMENTS

KR    101979584 B1 * 5/2019 ............... G06N 3/08

OTHER PUBLICATIONS

Abdelhamed, Abdelrahman et al., "Noise Flow: Noise Modeling with Conditional Normalizing Flows", Aug. 22, 2019 (Year: 2019).*
Abdelrahman Abdelhamed, Marcus A. Brubaker, Michael S. Brown "Noise Flow: Noise Modeling with Conditional Normalizing Flows" ICCV, 2019. pp. 3165-3173.

* cited by examiner

*Primary Examiner* — Chan S Park
*Assistant Examiner* — Daniel C Chang
(74) *Attorney, Agent, or Firm* — Farjami & Farjami LLP

(57) ABSTRACT

According to one implementation, a system for performing re-noising and neural network (NN) based image enhancement includes a computing platform having a processing hardware and a system memory storing a software code, a noise synthesizer, and an image restoration NN. The processing hardware is configured to execute the software code to receive a denoised image component and a noise component extracted from a degraded image, to generate, using the noise synthesizer and the noise component, synthesized noise corresponding to the noise component, and to interpolate, using the noise component and the synthesized noise, an output image noise. The processing hardware is further configured to execute the software code to enhance, using the image restoration NN, the denoised image component to provide an output image component, and to re-noise the output image component, using the output image noise, to produce an enhanced output image corresponding to the degraded image.

20 Claims, 9 Drawing Sheets

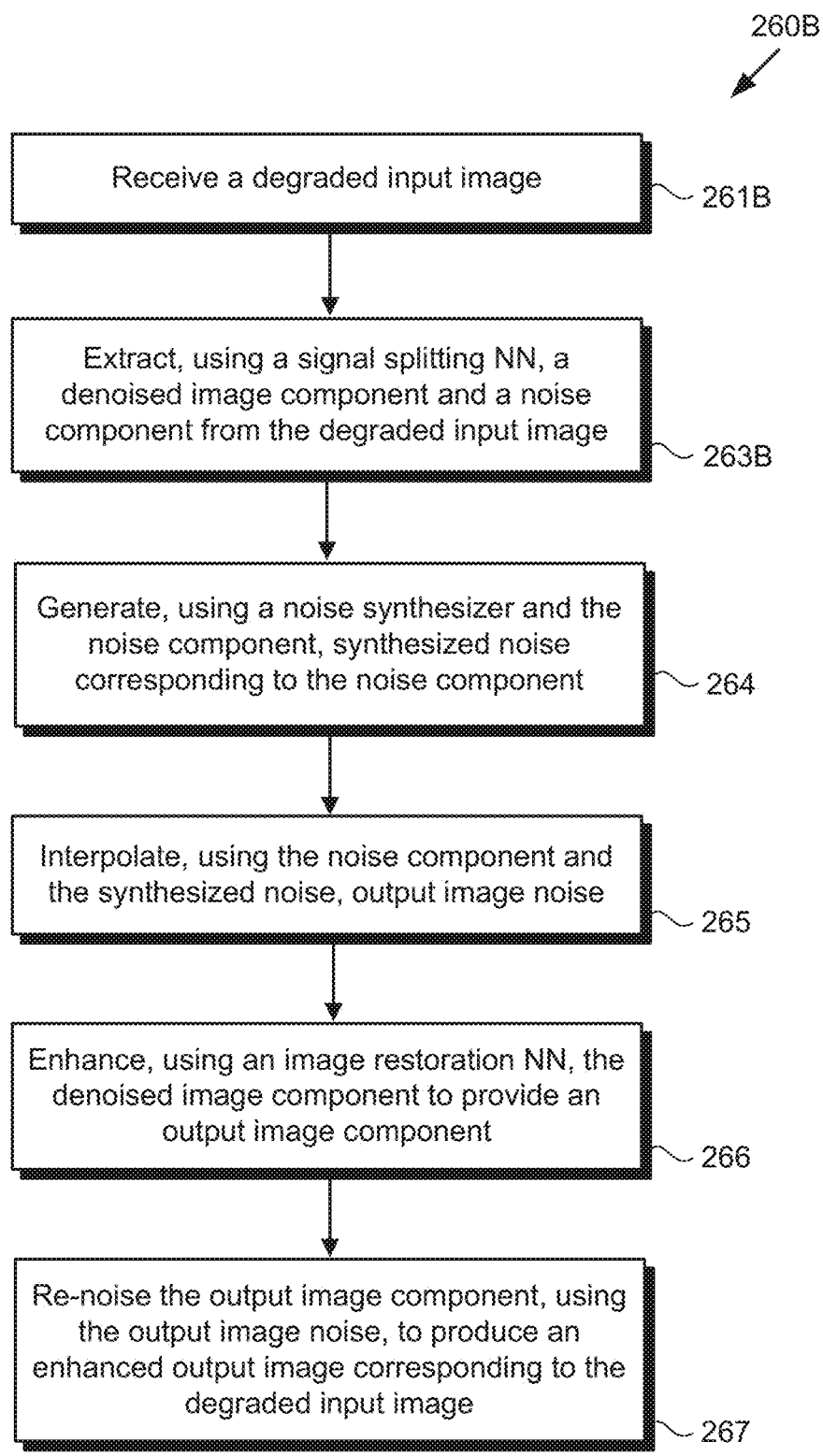

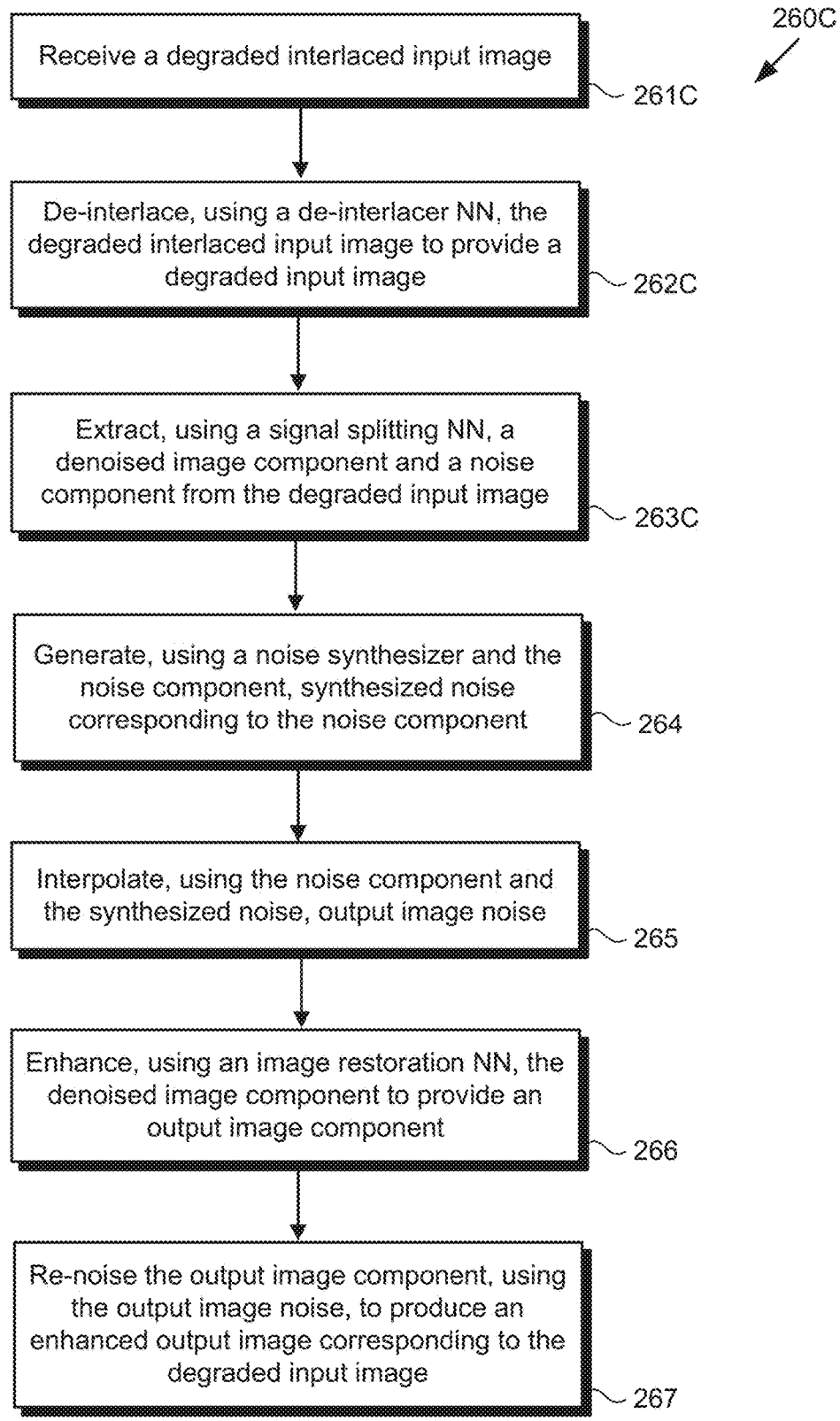

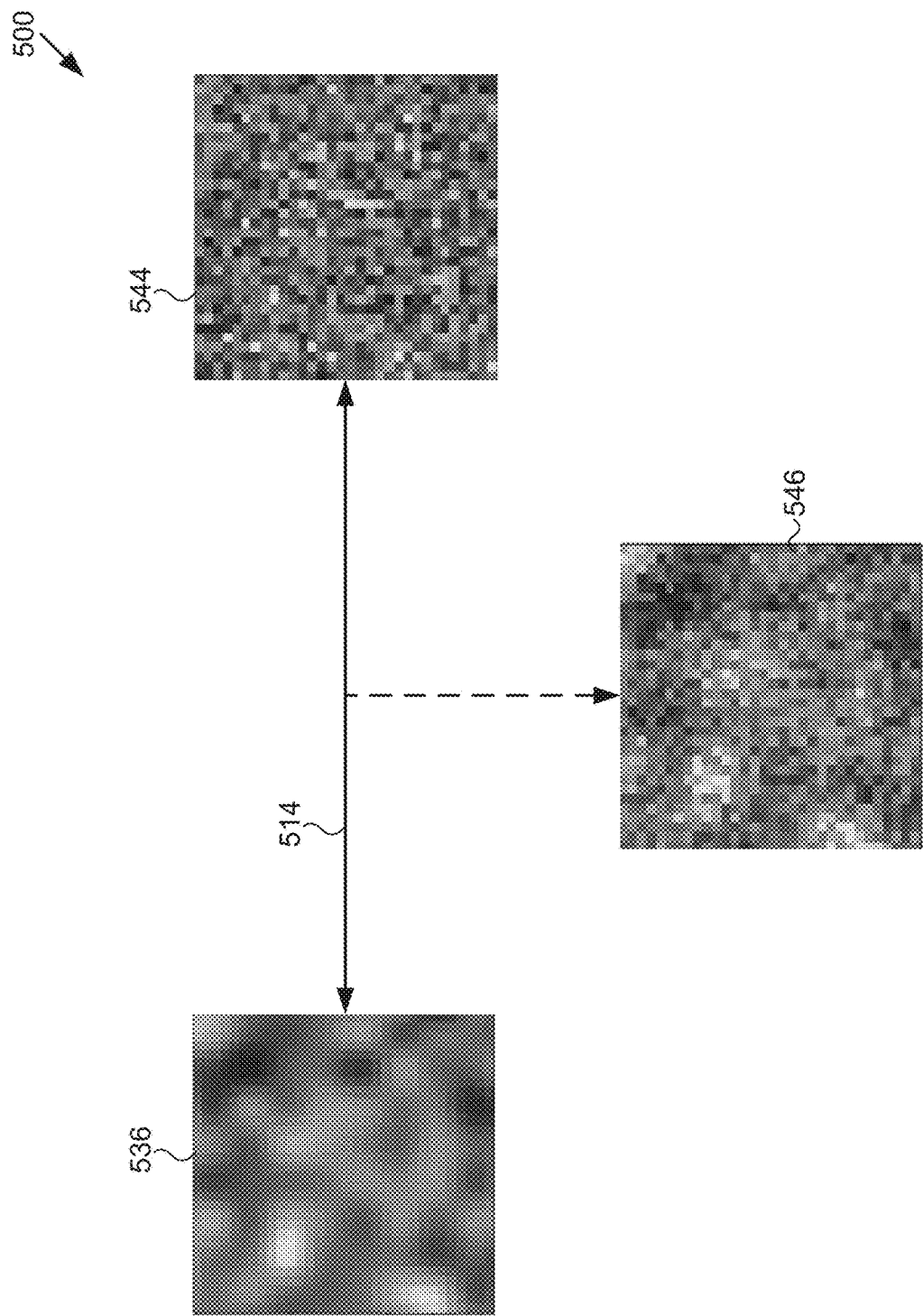

RE-NOISING AND NEURAL NETWORK BASED IMAGE ENHANCEMENT

BACKGROUND

Image processing techniques are important to many applications. For example, in image enhancement, a degraded version of an image is processed using one or more techniques to de-blur or sharpen the degraded image, or to reduce noise present in the degraded image. Despite its usefulness for recovering degraded image features, image enhancement can present significant challenges. For example, legacy video content for which remastering may be desirable is often available only in interlaced, noisy, and low resolution formats. As a result the remastering process has to be carefully engineered to enhance desirable image features while avoiding exaggeration of degraded features in the image. Nevertheless, in the interests of preserving the original aesthetic of legacy content undergoing remastering, as well as to respect the artistic intent of its creators, it may be advantageous or desirable to retain some nominally degraded features, such as some noise, for example, to enhance the apparent authenticity of remastered content, as well as the imagery it contains.

BRIEF DESCRIPTION OF THE DRAWINGS

FIG. 2B shows a flowchart presenting an exemplary method for performing re-noising and NN based image enhancement that corresponds to the system shown in FIG. 1B;

FIG. 2C shows a flowchart presenting an exemplary method for performing re-noising and NN based image enhancement that corresponds to the system shown in FIG. 1C;

FIG. 5 shows a diagram of another depiction of interpolation of output image noise for an enhanced image based on a noise component of a degraded image and a synthesized noise generated by a system for performing re-noising and NN based image enhancement.

DETAILED DESCRIPTION

Figure 1A:
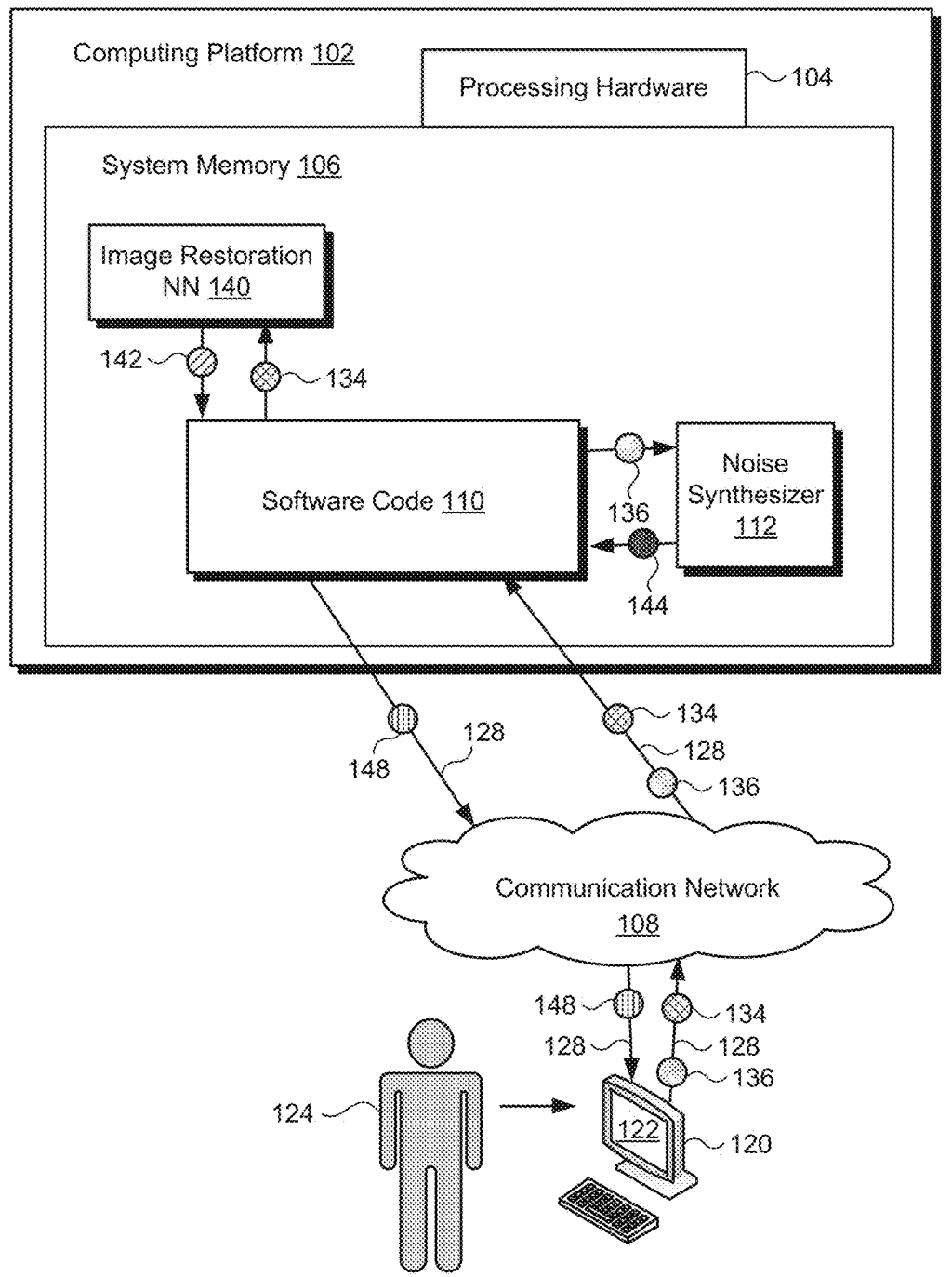
FIG. 1A shows a diagram of an exemplary system for performing re-noising and neural network (NN) based image enhancement, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing re-noising and neural network (NN) based image enhancement that overcome the drawbacks and deficiencies in the conventional art. It is noted that, as defined in the present application, the expression "re-noising" refers to the addition of "noise" to the color values of an image, where the noise can be either content dependent or content independent. For example, in photography, film grain generation, as known in the art, is a particular instance of such re-noising.

It is further noted that, in some implementations, the present image enhancement solution may be implemented using an integrated processing pipeline that may be substantially automated from end-to-end. As defined in the present application, the terms "automation," "automated," and "automating" refer to systems and processes that do not require human intervention. Although, in some implementations, a human system administrator may review or even modify the performance of an automated system or process, that human involvement is optional. Thus, in some implementations, the systems and methods characterized as automated in the present application may be performed under the control of hardware processing components executing them.

Moreover, as defined in the present application, the expression neural network or NN may refer to a computing architecture implementing a mathematical model for making future predictions based on patterns learned from samples of data or "training data." Various learning algorithms can be used to map correlations between input data and output data. These correlations form the mathematical model that can be used to make future predictions on new input data.

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

FIG. 1A shows a diagram of exemplary system 100A for performing re-noising and NN based image enhancement, according to one implementation. As shown in FIG. 1A, system 100A includes computing platform 102 having processing hardware 104, and system memory 106 implemented as a computer-readable non-transitory storage medium. According to the present exemplary implementation, system memory 106 stores software code 110, noise synthesizer 112, which may be implemented as a trained NN based noise synthesizer for example, and image restoration NN 140.

As further shown in FIG. 1A, system 100A is implemented within a use environment including communication network 108, user system 120 including display 122, and user 124 utilizing user system 120, as well as network communication links 128 interactively connecting user system 120 and system 100A via communication network 108.

Also shown in FIG. 1 are denoised image component 134 and noise component 136 extracted from a degraded image (degraded image not shown in FIG. 1), synthesized noise 144 generated by noise synthesizer 112 based on noise component 136, output image component 142 produced from denoised image component 134. In addition. FIG. 1A shows enhanced output image 148 corresponding to the degraded image from which denoised image component 134 and noise component 136 are extracted, enhanced output image 148 being produced using software code 110.

With respect to the representation of system 100A shown in FIG. 1A, it is noted that although software code 110, noise synthesizer 112, and image restoration NN 140 are depicted as being stored in system memory 106 for conceptual clarity, more generally, system memory 106 may take the form of any computer-readable non-transitory storage medium. The expression "computer-readable non-transitory storage medium." as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1A depicts software code 110, noise synthesizer 112, and image restoration NN 140 as being mutually co-located in system memory 106 that representation is also merely provided as an aid to conceptual clarity. More generally, system 100A may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100A. Thus, it is to be understood that software code 110, noise synthesizer 112, and image restoration NN 140 may be stored remotely from one another within the distributed memory resources of system 100A. It is also noted that, in some implementations, one or both of noise synthesizer 112 and image restoration NN 140 may take the form of a software module included in software code 110.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. However, in some implementations, system 100A may be implemented virtually, such as in a data center. For example, in some implementations, system 100A may be implemented in software, or as virtual machines. Moreover, in some implementations, communication network 108 may be a high-speed network suitable for high performance computing (HPC), for example a 10 GigE network or an Infiniband network.

Although user system 120 is shown as a desktop computer in FIG. 1A that representation is provided merely as an example as well. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example.

It is noted that, in various implementations, enhanced output image 148, when generated using software code 110, may be stored in system memory 106, may be copied to non-volatile storage, or both. Alternatively, or in addition, as shown in FIG. 1, in some implementations, enhanced output image 148 may be sent to user system 120 including display 122, for example by being transferred via network communication links 128 of communication network 108.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Furthermore, display 122 of user system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 1B:
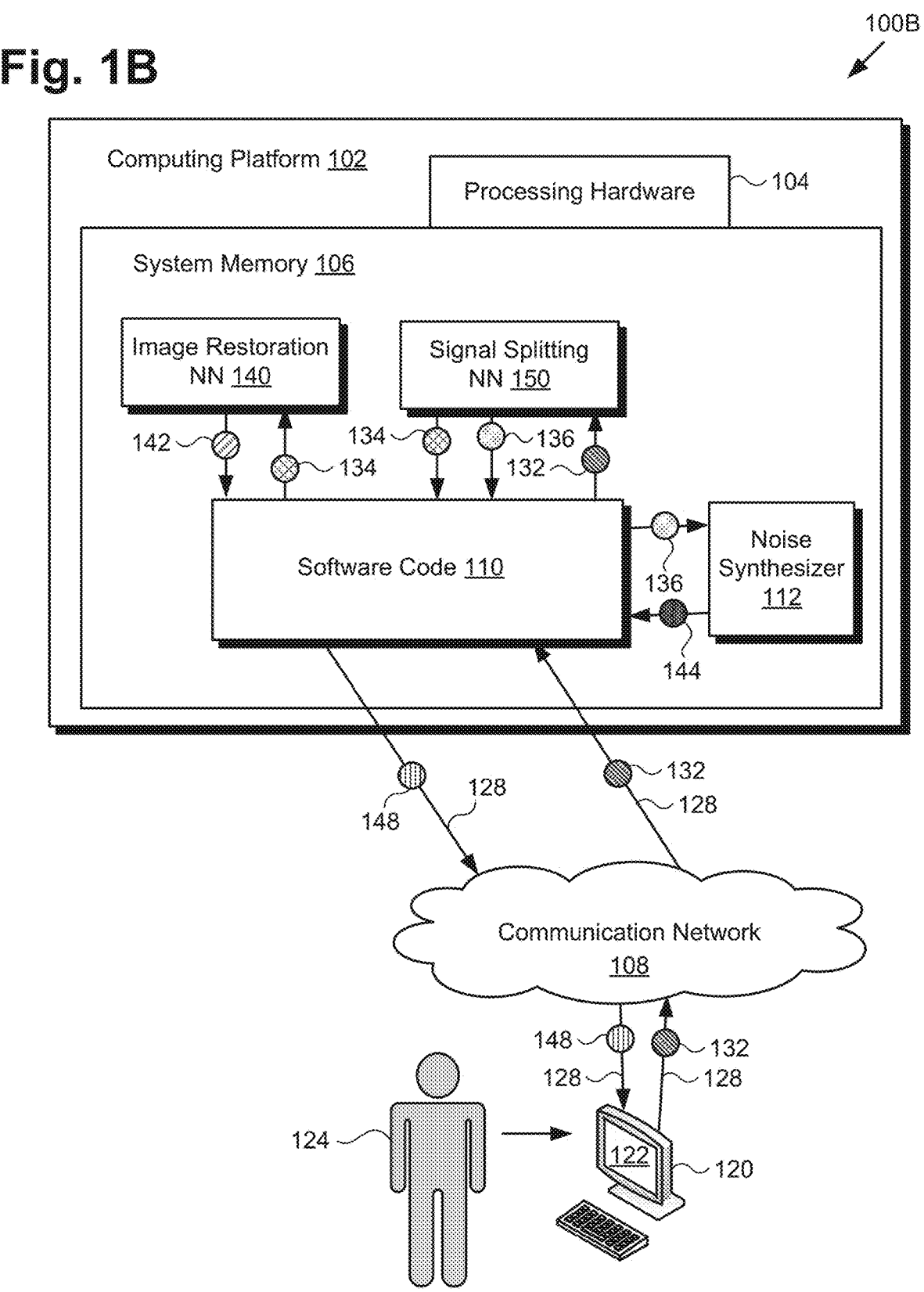
FIG. 1B shows a diagram of an exemplary system for performing re-noising and NN based image enhancement, according to another implementation.

FIG. 1B shows a diagram of exemplary system 100B for performing re-noising and NN based image enhancement, according to another implementation. It is noted that any feature shown in FIG. 1B and identified by a reference number identical to one used to identify a feature shown in FIG. 1A corresponds to that previously described feature and may share any of the characteristics attributed to that corresponding feature by the present disclosure. In addition to the features shown and described above by reference to system 100A, system 100B includes signal splitting NN 150 stored in system memory 106, and degraded input image 132 received by system 100B from user system 120.

Figure 1C:
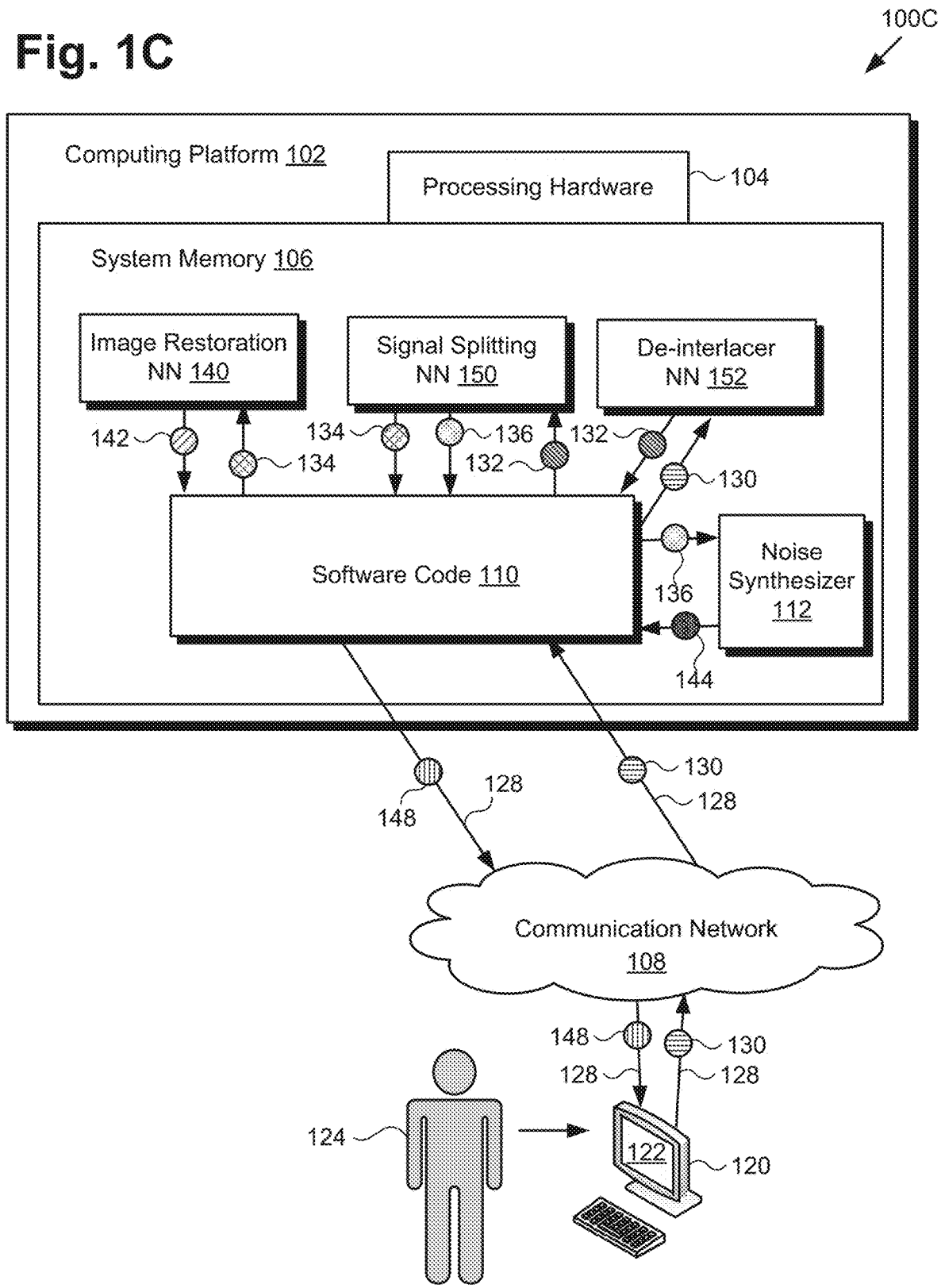
FIG. 1C shows a diagram of an exemplary system for performing re-noising and NN based image enhancement, according to yet another implementation.

FIG. 1C shows a diagram of exemplary system 100C for performing re-noising and NN based image enhancement, according to yet another implementation. It is noted that any feature shown in FIG. 1C and identified by a reference number identical to one used to identify a feature shown in FIG. 1A or FIG. 1B corresponds to that previously described feature and may share any of the characteristics attributed to that corresponding feature by the present disclosure. In addition to the features shown and described above by reference to systems 100A and 100B, system 100C includes de-interlacer NN 152 stored in system memory 106, and degraded interlaced input image 130 received by system 100C from user system 120.

Figure 2A:
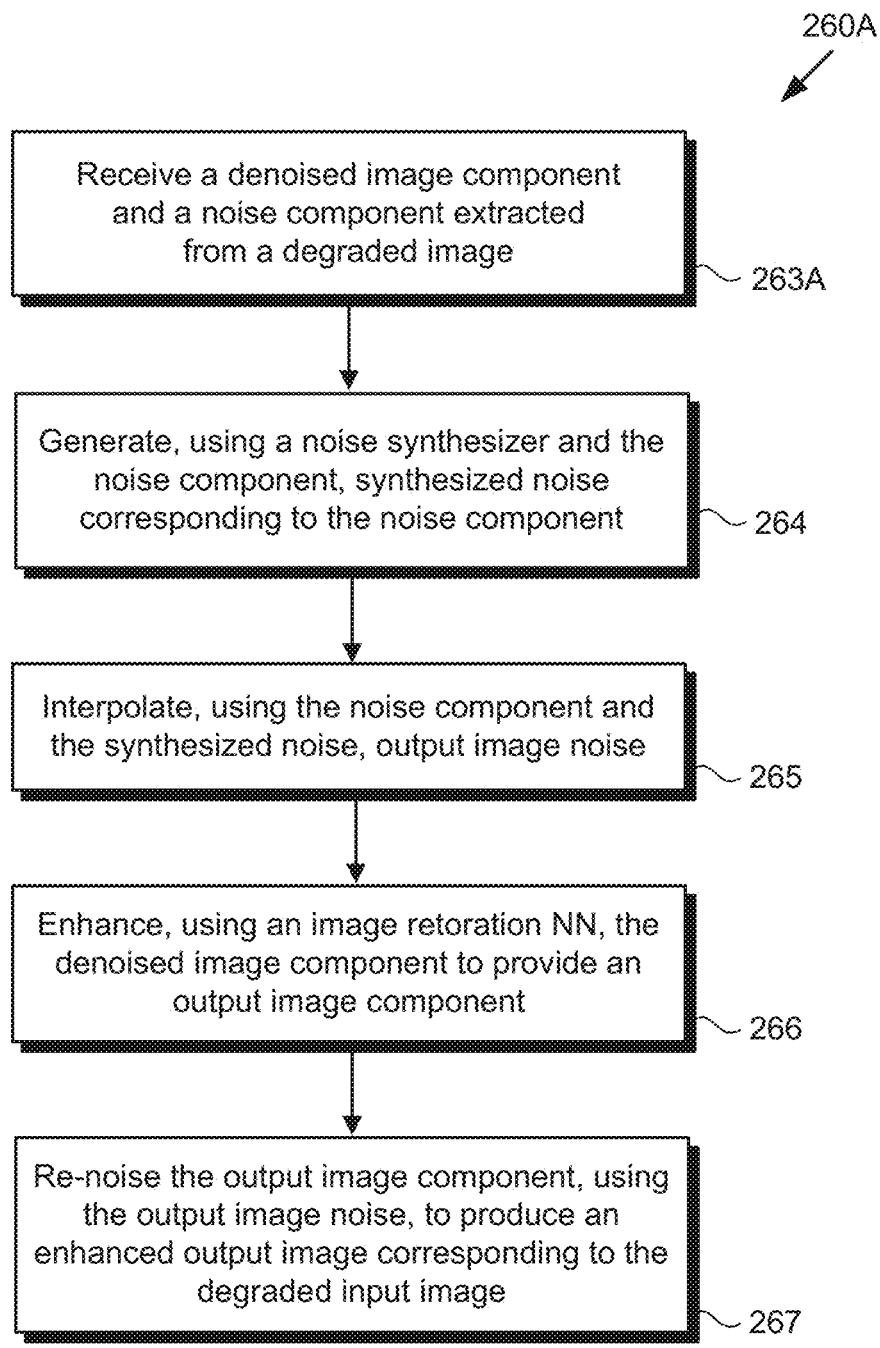
FIG. 2A shows a flowchart presenting an exemplary method for performing re-noising and NN based image enhancement that corresponds to the system shown in FIG. 1A.

The functionality of systems 100A, 100B, and 100C will be further described by reference to respective FIGS. 2A, 2B, and 2C, and further by reference to FIGS. 3, 4, and 5. FIG. 2A shows flowchart 260A presenting an exemplary method for performing re-noising and NN based image enhancement that corresponds to system 100A, while FIG. 2B shows flowchart 260B presenting an exemplary method for performing re-noising and NN based image enhancement that corresponds to system 100B. FIG. 2C shows flowchart 260C presenting an exemplary method for performing re-noising and NN based image enhancement that corresponds to system 100C. With respect to the methods outlined in FIGS. 2A, 2B, and 2C, it is noted that certain details and features have been left out of flowcharts 260A, 260B, and 260C in order not to obscure the discussion of the inventive features in the present application.

Figure 3:
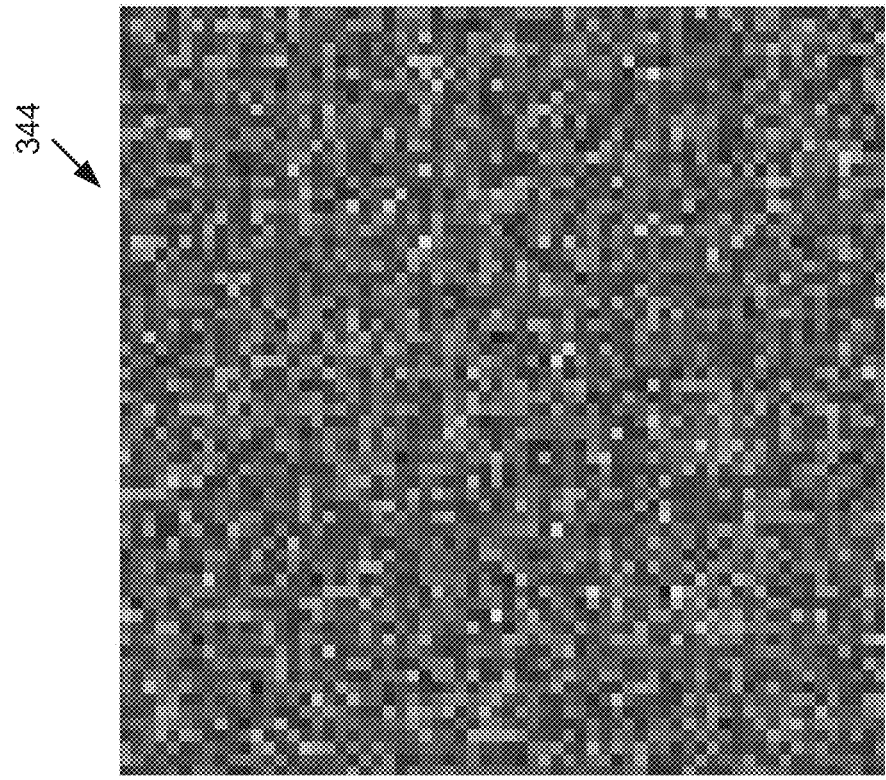
FIG. 3 shows a side-by-side comparison of a noise component of a degraded image and a synthesized noise generated by a system for performing re-noising and NN based image enhancement, according to one implementation.
Figure 3:
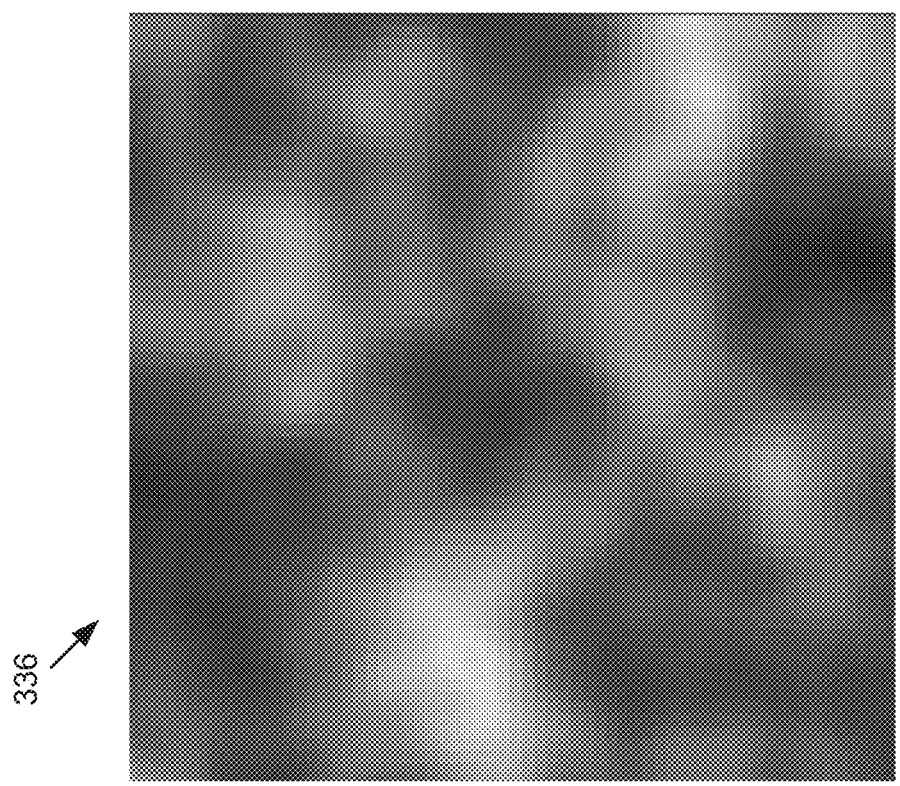

FIG. 3 shows a side-by-side comparison of noise component 336 of a degraded image corresponding to degraded input image 132 in FIGS. 1B and 1C, and synthesized noise 344 generated by a system for performing re-noising and NN based image enhancement, according to one implementation. Noise component 336 and synthesized noise 344 correspond respectively in general to noise component 136 and synthesized noise 144 in FIGS. 1A, 1B, and 1C. That is to say, noise component 336 and synthesized noise 344 may share any of the characteristics attributed to respective noise component 136 and synthesized noise 144 by the present disclosure, and vice versa.

Figure 4:
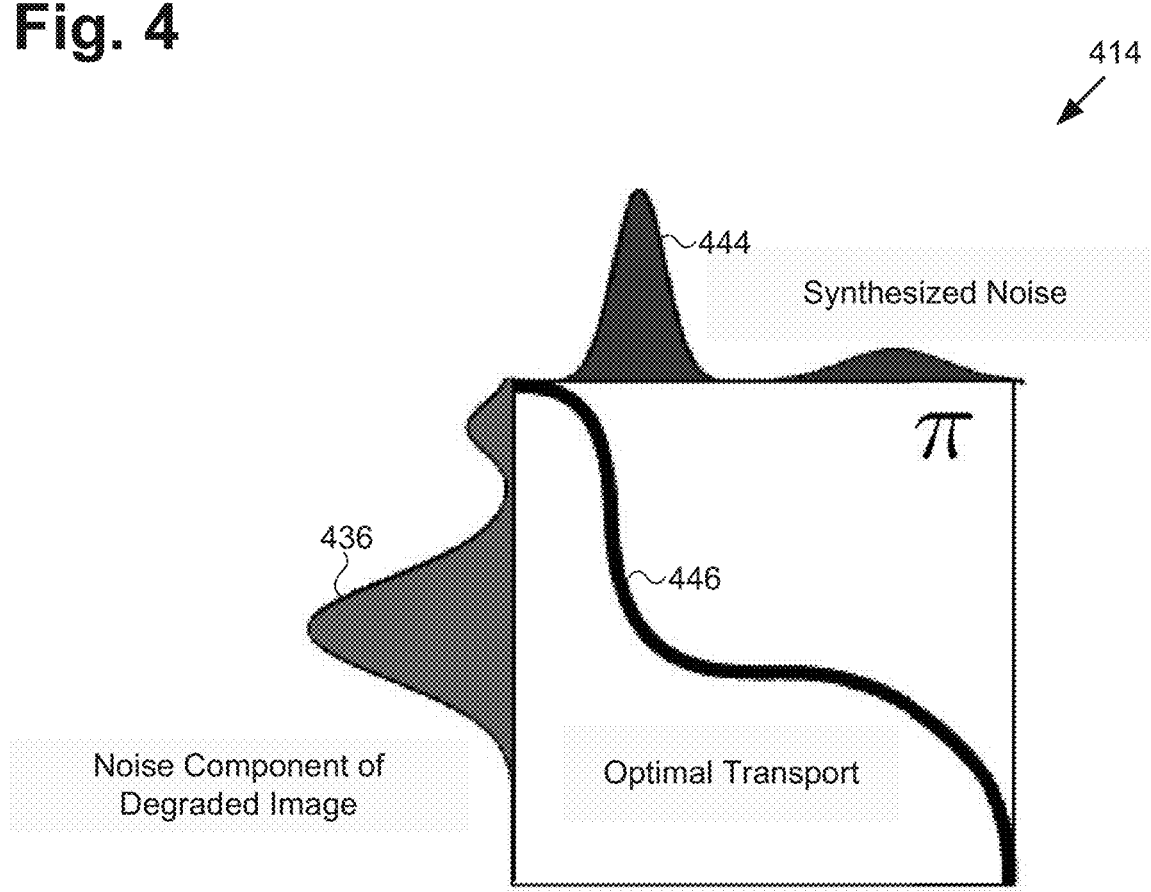
FIG. 4 shows a diagram depicting interpolation of output image noise for an enhanced image based on a noise component of a degraded image and a synthesized noise generated by a system for performing re-noising and NN based image enhancement, according to one implementation.

FIG. 4 shows a diagram depicting interpolation 414 of output image noise 446 for an enhanced image corresponding to enhanced output image shown in FIGS. 1A, 1B, and 1C, based on noise component 436 of a degraded image corresponding to degraded input image 132 in FIGS. 1B and 1C, and synthesized noise 444 generated by a system for performing re-noising and NN based image enhancement, according to one implementation. Noise component 436 and synthesized noise 444 correspond respectively in general to noise component 136/336 and synthesized noise 144/344 in FIGS. 1A, 1B, 1C, and 3. Thus, noise component 436 and synthesized noise 444 may share any of the characteristics attributed to respective noise component 136/336 and synthesized noise 144/344 by the present disclosure, and vice versa.

FIG. 5 shows diagram 500 of another depiction of interpolation 514 of output image noise 546 for an enhanced image corresponding to enhanced output image 148 in FIGS. 1A, 1B, and 1C, based on noise component 536 of a degraded image corresponding to degraded input image 132 in FIGS. 1B and 1C, and synthesized noise 544 generated by a system for performing re-noising and NN based image enhancement. Noise component 536 and synthesized noise 544 correspond respectively in general to noise component 136/336/436 and synthesized noise 144/344/444 in FIGS. 1A, 1B, 1C, 3, and 4. Thus, noise component 536 and synthesized noise 544 may share any of the characteristics attributed to respective noise component 136/336/436 and synthesized noise 144/344/444 by the present disclosure, and vice versa. In addition, interpolation 514 and output image noise 546, in FIG. 5, correspond respectively in general to interpolation 414 output image noise 446, in FIG. 4. As a result, interpolation 514 and output image noise 546 may share any of the characteristics attributed to respective interpolation 414 and output image noise 446 by the present disclosure, and vice versa.

Referring to system 100A in FIG. 1A in combination with FIGS. 2A, 3, 4, and 5, according to the exemplary implementation shown in FIG. 1A, processing hardware 104 of computing platform 102 may execute software code 110 to receive denoised image component 134 and noise component 136/336/436/536 extracted from a degraded image (action 263A). In addition, processing hardware 104 may execute software code to generate, using noise synthesizer 112 and noise component 136/336/436/536, synthesized noise 144/344/444/544 corresponding to noise component 136/336/436/536 (action 264). In some implementations, synthesized noise 144/344/444/544 may be a higher resolution noise than noise component 136/336/436/536.

With respect to "high resolution noise" or "higher resolution noise" and "low resolution noise" or "lower resolution noise," those expressions refer to noise values on respective high resolution and low resolution grids, as known in the art. The low resolution grid has the same size as the original degraded image from which denoised image component 134 and noise component 136/336/436/536 received in action 263A have been extracted. This low resolution grid includes original color values, denoised colors, and noise values for the degraded image. By contrast, the high resolution grid has the same size as the target resolution for enhanced output image 148. This high resolution grid includes new color values obtained from the restoration/enhancement process, synthesized noise values, and upscaled noise values (obtained by upscaling the noise values for the degraded image using any suitable known method). Thus, high resolution and low resolution refer to the grid sizes described above. That is to say, high resolution noise refers specifically to noise values on the high resolution grid, while low resolution noise refers to noise values on the low resolution grid.

Processing hardware 104 may further execute software code 110 to interpolate, using noise component 136/336/436/536 and synthesized noise 144/344/444/544, output image noise 446/546 (action 265). As shown in FIG. 3, in some implementations, interpolation 414/514 of output image noise 446/546 may include solving an optimal transport problem between noise component 136/336/436/536 and synthesized noise 144/344/444/544. That is to say, in some implementations, processing hardware 104 may execute software code 110 to interpolate output image noise 446/546 by solving an optimal transport problem between noise component 136/336/436/536 and synthesized noise 144/344/444/544.

In some implementations, it may be advantageous or desirable to solve the optimal transport problem between noise component 136/336/436/536 and synthesized noise 144/344/444/544 having the same size. In one such implementation, noise component 136/336/436/536, which is typically a low resolution noise component, may be upscaled using any upscaling technique known in the art, such as bicubic upscaling, for example, before the optimal transport problem is posed and solved. That is to say, in some implementations the optimal transport problem may be solved between an upscaled version of noise component 136/336/436/536 and synthesized noise 144/344/444/544 having the same grid size as the upscaled version of noise component 136/336/436/536. Alternatively, in some other implementations, synthesized noise 144/344/444/544 may be low resolution noise synthesized directly from low resolution noise component 136/336/436/536, and the optimal transport problem may be solved between noise component 136/336/436/536 in its received low resolution form and low resolution synthesized noise 144/344/444/544 having the same size as low resolution noise component 136/336/436/536.

Moreover, in some implementations, interpolation 414/514 of output image noise 446/546 may be based on noise samples in the form of five-dimensional (5D) vectors having respective red, green, and blue color components, as well as respectively weighted "x" and "y" location components. Interpolation 414/514 may include one or more of computing the Sinkhorn divergence or computing the gradient by backpropagation. In some implementations, output image noise 446/546 may be a higher resolution noise than noise component 136/336/436/536, while in some implementations output image noise 446/546 and synthesized noise 144/344/444/544 may have the same resolution. In yet other implementations, output image noise 446/546 may be a lower resolution noise than synthesized noise 144/344/444/544.

Processing hardware 104 may also execute software code 110 to enhance, using image restoration NN 140, denoised image component 134 to provide output image component 142 (action 266). Enhancement of denoised image component 134 may include upscaling, sharpening, or upscaling and sharpening of denoised image component 134 using image restoration NN 140 specifically trained for that purpose. Exemplary techniques for upscaling images are disclosed by U.S. patent application Ser. No. 16/542,227, titled "Techniques for Upscaling Images Generated with Undetermined Downscaling Kernels," and filed on Aug. 15, 2019, which is hereby incorporated fully by reference into the present application. It is emphasized that the image enhancement performed by image restoration NN 140 is applied to denoised image component 134, but not to noise component 136/336/436/536, which is processed independently of denoised image component 134, as described above.

It is noted that although flowchart 260A shows action 266 as following actions 264 and 265, that representation is merely by way of example. In some other implementations, action 266 may precede one or both of actions 264 and 265. In yet other implementations, action 266 may be performed in parallel, i.e., substantially concurrently, with either or both of actions 264 and 265. That is to say, in various implementations action 266 may be performed after action 264 but before action 265, before actions 264 and 265, in parallel with action 264, in parallel with action 265, or in parallel with the sequence of actions 264 and 265. Processing hardware 104 may then execute software code 110 to re-noise output image component 142, using output image noise 446/546, to produce enhanced output image 148 corresponding to the degraded image from which denoised image component 134 and noise component 136/336/436/536 were extracted (action 267). It is noted that, in implementations in which noise component 136/336/436/536 is upscaled prior to solution of the optimal transport problem between the upscaled version of noise component 136/336/436/536 and synthesized noise 144/344/444/544, output image noise 446/546 may be used directly to re-noise output image component 142. However, in implementations in which interpolation of output image noise 446/546 is performed by solving an optimal transport problem between noise component 136/336/436/536 in its received low resolution form and low resolution synthesized noise 144/344/444/544 having the same size as low resolution noise component 136/336/436/536, output image noise 446/546 may be upscaled prior to its use in re-noising output image component 142 to produce enhanced output image component 148. In some implementations, enhanced output image 148 may be de-blurred relative to denoised image component 134 of the degraded image. In addition, or alternatively, in some implementations enhanced output image 148 may be a higher resolution image than denoised image component 134 of the degraded image.

Referring to system 100B in FIG. 1B in combination with FIGS. 2B, 3, 4, and 5, according to the exemplary implementation shown in FIG. 1B, processing hardware 104 of computing platform 102 may execute software code 110 to receive degraded input image 132 (action 261B). Processing hardware 104 may further executed software code 110 to extract, using signal splitting NN 150, denoised image component 134 and noise component 136/336/436/536 from degraded input image 132 (action 263B). In addition, processing hardware 104 may execute software code to generate, using noise synthesizer 112 and noise component 136/336/436/536, synthesized noise 144/344/444/544 corresponding to noise component 136/336/436/536 (action 264). As noted above, in some implementations, synthesized noise 144/344/444/544 may be a higher resolution noise than noise component 136/336/436/536.

Processing hardware 104 may further execute software code 110 to interpolate, using noise component 136/336/436/536 and synthesized noise 144/344/444/544, output image noise 446/546 (action 265). As noted above and as shown in FIG. 3, in some implementations interpolation 414/514 of output image noise 446/546 may include solving an optimal transport problem between noise component 136/336/436/536 and synthesized noise 144/344/444/544. That is to say, in some implementations processing hardware 104 may execute software code 110 to interpolate output image noise 446/546 by solving an optimal transport problem between noise component 136/336/436/536 and synthesized noise 144/344/444/544.

As noted above, in some implementations, it may be advantageous or desirable to solve the optimal transport problem between noise component 136/336/436/536 and synthesized noise 144/344/444/544 having the same size. In one such implementation, noise component 136/336/436/536, which is typically a low resolution noise component, may be upscaled using any upscaling technique known in the art, such as bicubic upscaling, for example, before the optimal transport problem is posed and solved. That is to say, in some implementations the optimal transport problem may be solved between an upscaled version of noise component 136/336/436/536 and synthesized noise 144/344/444/544 having the same size as the upscaled version of noise component 136/336/436/536. Alternatively, in some other implementations, synthesized noise 144/344/444/544 may be low resolution noise synthesized directly from low resolution noise component 136/336/436/536, and the optimal transport problem may be solved between noise component 136/336/436/536 in its received low resolution form and low resolution synthesized noise 144/344/444/544 having the same grid size as low resolution noise component 136/336/436/536.

Moreover and as also noted above, in some implementations, interpolation 414/514 of output image noise 446/546 may be based on noise samples in the form of 5D vectors having respective red, green, and blue color components, as well as respectively weighted "x" and "y" location components. Interpolation 414/514 may include one or more of computing the Sinkhorn divergence and computing the gradient by backpropagation. As further described above, in some implementations, output image noise 446/546 may be a higher resolution noise than noise component 136/336/436/536, while in some implementations output image noise 446/546 and synthesized noise 144/344/444/544 may have the same resolution. In yet other implementations, output image noise 446/546 may be a lower resolution noise than synthesized noise 144/344/444/544.

Processing hardware 104 may also execute software code 110 to enhance, using image restoration NN 140, denoised image component 134 to provide output image component 142 (action 266). As noted above, enhancement of denoised image component 134 may include upscaling, sharpening, or upscaling and sharpening of denoised image component 134 using image restoration NN 140 specifically trained for that purpose. As also noted above, exemplary techniques for upscaling images are disclosed by U.S. patent application Ser. No. 16/542,227, titled "Techniques for Upscaling Images Generated with Undetermined Downscaling Kernels," and filed on Aug. 15, 2019, which is incorporated fully by reference into the present application. It is emphasized that the image enhancement performed by image restoration NN 140 is applied to denoised image component 134 but not to noise component 136/336/436/536, which is processed independently of denoised image component 134, as described above.

It is noted that although flowchart 260B shows action 266 as following actions 264 and 265, that representation is merely by way of example. In some other implementations, action 266 may precede one or both of actions 264 and 265. In yet other implementations, action 266 may be performed in parallel. i.e., substantially concurrently, with either or both of actions 264 and 265. That is to say, in various implementations action 266 may be performed after action 264 but before action 265, before actions 264 and 265, in parallel with action 264, in parallel with action 265, or in parallel with the sequence of actions 264 and 265.

Processing hardware 104 may then execute software code 110 to re-noise output image component 142, using output image noise 446/546, to produce enhanced output image 148 corresponding to degraded input image 132 (action 267). As noted above, in implementations in which noise component 136/336/436/536 is upscaled prior to solution of the optimal transport problem between the upscaled version of noise component 136/336/436/536 and synthesized noise 144/344/444/544, output image noise 446/546 may be used directly to re-noise output image component 142. However, in implementations in which interpolation of output image noise 446/546 is performed by solving an optimal transport problem between noise component 136/336/436/536 in its received low resolution form and low resolution synthesized noise 144/344/444/544 having the same size as low resolution noise component 136/336/436/536, output image noise 446/546 may be upscaled prior to its use in re-noising output image component 142 to produce enhanced output image component 148. In some implementations, enhanced output image 148 may be de-blurred relative to denoised image component 134 of degraded input image 132. In addition, or alternatively, in some implementations enhanced output image 148 may be a higher resolution image than denoised image component 134 of degraded input image 132.

Referring to system 100C in FIG. 1C in combination with FIGS. 2C, 3, 4, and 5, according to the exemplary implementation shown in FIG. 1C, processing hardware 104 of computing platform 102 may execute software code 110 to receive degraded interlaced input image 130 (action 261C). Processing hardware 104 may further execute software code 110 to de-interlace, using de-interlacer NN 152, degraded interlaced input image 130 to provide degraded input image 132 as progressive frames (action 262C). In addition, processing hardware 104 may execute software code to extract, using signal splitting NN 150, denoised image component 134 and noise component 136/336/436/536 from degraded input image 132 (263C). Processing hardware 104 may further execute software code to generate, using noise synthesizer 112 and noise component 136/336/436/536, synthesized noise 144/344/444/544 corresponding to noise component 136/336/436/536 (action 264). As noted above, in some implementations, synthesized noise 144/344/444/544 may be a higher resolution noise than noise component 136/336/436/536.

Processing hardware 104 may also execute software code 110 to interpolate, using noise component 136/336/436/536 and synthesized noise 144/344/444/544, output image noise 446/546 (action 265). As noted above and as shown in FIG. 3, in some implementations interpolation 414/514 of output image noise 446/546 may include solving an optimal transport problem between noise component 136/336/436/536 and synthesized noise 144/344/444/544. That is to say, in some implementations processing hardware 104 may execute software code 110 to interpolate output image noise 446/546 by solving an optimal transport problem between noise component 136/336/436/536 and synthesized noise 144/344/444/544.

As noted above, in some implementations, it may be advantageous or desirable to solve the optimal transport problem between noise component 136/336/436/536 and synthesized noise 144/344/444/544 having the same size. In one such implementation, noise component 136/336/436/536, which is typically a low resolution noise component, may be upscaled using any upscaling technique known in the art, such as bicubic upscaling, for example, before the optimal transport problem is posed and solved. That is to say, in some implementations the optimal transport problem may be solved between an upscaled version of noise component 136/336/436/536 and synthesized noise 144/344/444/544 having the same grid size as the upscaled version of noise component 136/336/436/536. Alternatively, in some other implementations, synthesized noise 144/344/444/544 may be low resolution noise synthesized directly from low resolution noise component 136/336/436/536, and the optimal transport problem may be solved between noise component 136/336/436/536 in its received low resolution form and low resolution synthesized noise 144/344/444/544 having the same size as low resolution noise component 136/336/436/536.

Moreover and as also noted above, in some implementations, interpolation 414/514 of output image noise 446/546 may be based on noise samples in the form of 5D vectors having respective red, green, and blue color components, as well as respectively weighted "x" and "y" location components. Interpolation 414/514 may include one or more of computing the Sinkhorn divergence and computing the gradient by backpropagation. As further described above, in some implementations, output image noise 446/546 may be a higher resolution noise than noise component 136/336/436/536, while in some implementations output image noise 446/546 and synthesized noise 144/344/444/544 may have the same resolution. In yet other implementations, output image noise 446/546 may be a lower resolution noise than synthesized noise 144/344/444/544.

Processing hardware 104 may further execute software code 110 to enhance, using image restoration NN 140, denoised image component 134 to provide output image component 142 (action 266). As noted above, enhancement of denoised image component 134 may include upscaling, sharpening, or upscaling and sharpening of denoised image component 134 using image restoration NN 140 specifically trained for that purpose. As also noted above, exemplary techniques for upscaling images are disclosed by U.S. patent application Ser. No. 16/542,227, titled "Techniques for Upscaling Images Generated with Undetermined Downscaling Kernels." and filed on Aug. 15, 2019, which is incorporated fully by reference into the present application. It is emphasized that the image enhancement performed by image restoration NN 140 is applied to denoised image component 134 but not to noise component 136/336/436/536, which is processed independently of denoised image component 134, as described above.

It is noted that although flowchart 260C shows action 266 as following actions 264 and 265, that representation is merely by way of example. In some other implementations, action 266 may precede one or both of actions 264 and 265. In yet other implementations, action 266 may be performed in parallel, i.e., substantially concurrently, with either or both of actions 264 and 265. That is to say, in various implementations action 266 may be performed after action 264 but before action 265, before actions 264 and 265, in parallel with action 264, in parallel with action 265, or in parallel with the sequence of actions 264 and 265.

Processing hardware 104 may then execute software code 110 to re-noise output image component 142, using output image noise 446/546, to produce enhanced output image 148 corresponding to degraded input image 132 (action 267). As noted above, in implementations in which noise component 136/336/436/536 is upscaled prior to solution of the optimal transport problem between the upscaled version of noise component 136/336/436/536 and synthesized noise 144/344/444/544, output image noise 446/546 may be used directly to re-noise output image component 142. However, in implementations in which interpolation of output image noise 446/546 is performed by solving an optimal transport problem between noise component 136/336/436/536 in its received low resolution form and low resolution synthesized noise 144/344/444/544 having the same size as low resolution noise component 136/336/436/536, output image noise 446/546 may be upscaled prior to its use in re-noising output image component 142 to produce enhanced output image component 148. In some implementations, enhanced output image 148 may be de-blurred relative to denoised image component 134 of degraded input image 132. In addition, or alternatively, in some implementations enhanced output image 148 may be a higher resolution image than denoised image component 134 of degraded input image 132.

With respect to the actions outlined by flowcharts 260A, 260B, and 260C, it is noted that in some implementations, actions 263A. 264, 265, 266, and 267, or actions 261B. 263B. 264, 265, 266, and 267, or actions 261C. 262C. 263C. 264, 265, 266, and 267, may be performed in an automated process from which human involvement may be omitted.

Thus, the present application discloses systems and methods for performing re-noising and NN based image enhancement that overcome the drawbacks and deficiencies in the conventional art. The present image enhancement solution advances the state-of-the-art by performing enhancement processes on the denoised image component and noise component of a degraded image separately. This is advantageous because the image signal and the noise signal have different characteristics and can be most effectively processed independently of one another. An additional advancement introduced by the present image enhancement solution is a noise enhancement component that is able to interpolate between the original noise component of the degraded image and synthesized noise generated based on the original noise component, and to re-noise the enhanced output image using that interpolated noise. This is particularly advantageous for older legacy content for which it is desirable to retain some of the original look while still providing improved image quality.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a processing hardware and a system memory storing a software code, a noise synthesizer, and an image restoration neural network (NN):
   the processing hardware configured to execute the software code to:
   receive a denoised image component and a noise component extracted from a degraded image;
   generate, using the noise synthesizer and the noise component, a synthesized noise corresponding to the noise component;
   interpolate, using the noise component and the synthesized noise, an output image noise;
   enhance, using the image restoration NN, the denoised image component to provide an output image component; and
   re-noise the output image component, using the output image noise, to produce an enhanced output image corresponding to the degraded image.

2. The system of claim 1, wherein the processing hardware is further configured to execute the software code to:
   interpolate the output image noise by solving an optimal transport problem between the noise component and the synthesized noise.

3. The system of claim 1, wherein the enhanced output image is de-blurred relative to the denoised image component.

4. The system of claim 1, wherein the enhanced output image is a higher resolution image than the denoised image component.

5. The system of claim 1, wherein the synthesized noise is a higher resolution noise than the noise component.

6. The system of claim 1, wherein the output image noise is a higher resolution noise than the noise component.

7. The system of claim 1, wherein the output image noise and the synthesized noise have a same resolution.

8. A system comprising:
   a computing platform including a processing hardware and a system memory storing a software code, a noise synthesizer, a signal splitting neural network (NN), and an image restoration NN:
   the processing hardware configured to execute the software code to:

receive a degraded input image;
extract, using the signal splitting NN, a denoised image component and a noise component from the degraded input image;
generate, using the noise synthesizer and the noise component, a synthesized noise corresponding to the noise component;
interpolate, using the noise component and the synthesized noise, an output image noise;
enhance, using the image restoration NN, the denoised image component to provide an output image component; and
re-noise the output image component, using the output image noise, to produce an enhanced output image corresponding to the degraded input image.

9. The system of claim 8, wherein the processing hardware is further configured to execute the software code to:
interpolate the output image noise by solving an optimal transport problem between the noise component and the synthesized noise.

10. The system of claim 8, wherein the enhanced output image is de-blurred relative to the degraded input image.

11. The system of claim 8, wherein the enhanced output image is a higher resolution image than the degraded input image.

12. The system of claim 8, wherein the synthesized noise is a higher resolution noise than the noise component.

13. The system of claim 8, wherein the output image noise is a higher resolution noise than the noise component.

14. The system of claim 8, wherein the output image noise and the synthesized noise have a same resolution.

15. A system comprising:
a computing platform including a processing hardware and a system memory storing a software code, a noise synthesizer, a de-interlacer neural network (NN), a signal splitting NN, and an image restoration NN:
the processing hardware configured to execute the software code to:
receive a degraded interlaced input image;
de-interlace, using the de-interlacer NN, the degraded interlaced input image to provide a degraded input image;
extract, using the signal splitting NN, a denoised image component and a noise component from the degraded input image;
generate, using the noise synthesizer and the noise component, a synthesized noise corresponding to the noise component;
interpolate, using the noise component and the synthesized noise, an output image noise;
enhance, using the image restoration NN, the denoised image component to provide an output image component; and
re-noise the output image component, using the output image noise, to produce an enhanced output image corresponding to the degraded input image.

16. The system of claim 15, wherein the processing hardware is further configured to execute the software code to:
interpolate the output image noise by solving an optimal transport problem between the noise component and the synthesized noise.

17. The system of claim 15, wherein the enhanced output image is at least one of de-blurred relative to the degraded input image or a higher resolution image than the degraded input image.

18. The system of claim 15, wherein the synthesized noise is a higher resolution noise than the noise component.

19. The system of claim 15, wherein the output image noise is a higher resolution noise than the noise component.

20. The system of claim 15, wherein the output image noise and the synthesized noise have a same resolution.

* * * * *